United States Patent
Xiao et al.

(10) Patent No.: US 8,693,042 B2
(45) Date of Patent: Apr. 8, 2014

(54) IMAGE COPYING METHOD AND DEVICE

(75) Inventors: Jianhua Xiao, Shenzhen (CN); Jianfei Yu, Shenzhen (CN); Keying Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 51 days.

(21) Appl. No.: 13/577,444

(22) PCT Filed: Dec. 20, 2010

(86) PCT No.: PCT/CN2010/080027
§ 371 (c)(1),
(2), (4) Date: Aug. 7, 2012

(87) PCT Pub. No.: WO2012/051771
PCT Pub. Date: Apr. 26, 2012

(65) Prior Publication Data
US 2012/0307311 A1 Dec. 6, 2012

(30) Foreign Application Priority Data

Oct. 20, 2010 (CN) .......................... 2010 1 0514359

(51) Int. Cl.
*G06K 15/00* (2006.01)
*G06K 1/00* (2006.01)
*H04N 1/60* (2006.01)
*H04N 1/40* (2006.01)
*G09G 5/37* (2006.01)
*G06F 12/02* (2006.01)

(52) U.S. Cl.
USPC .......... 358/1.16; 358/1.18; 358/527; 358/1.9; 358/447; 358/448; 345/562; 345/565; 345/582; 345/584; 345/649

(58) Field of Classification Search
None
See application file for complete search history.

(56) References Cited

U.S. PATENT DOCUMENTS

| | | | | |
|---|---|---|---|---|
| 6,304,345 B1* | 10/2001 | Patton et al. | ................... | 358/527 |
| 6,433,888 B1* | 8/2002 | Patton et al. | ................. | 358/1.18 |
| 6,618,161 B1* | 9/2003 | Fresk et al. | ................... | 358/1.15 |
| 7,221,356 B2* | 5/2007 | Oliver et al. | ................... | 345/166 |
| 8,013,863 B2* | 9/2011 | Cohen et al. | ................... | 345/584 |
| 8,027,539 B2* | 9/2011 | Chen | ............................ | 382/185 |
| 2003/0133168 A1* | 7/2003 | Fresk et al. | .................... | 358/401 |
| 2009/0201520 A1* | 8/2009 | Hayashi et al. | ................. | 358/1.9 |
| 2011/0234636 A1* | 9/2011 | Itkin et al. | ..................... | 345/649 |

FOREIGN PATENT DOCUMENTS

CN 101707055 A 5/2010

OTHER PUBLICATIONS

International Search Report in international application No. PCT/CN2010/080027, mailed on Jul. 7, 2011.
English Translation of the Written Opinion of the International Search Authority in international application No. PCT/CN2010/080027, mailed on Jul. 7, 2011.
The Technology and Implement of BMP Image Division and Storage. 2009.

\* cited by examiner

*Primary Examiner* — Satwant Singh
(74) *Attorney, Agent, or Firm* — Oppedahl Patent Law Firm LLC

(57) ABSTRACT

The disclosure discloses an image copying method, which includes the steps of: copying, an image to be copied, to a destination address line by line, in the case of the image to be copied having a width of one pixel; copying, the image to be copied, to the destination address by a number of bytes according to a size of the image to be copied, in the case of the image to be copied not having a width of one pixel. The image copying method can save the image copying time and deduce the Central Processing Unit (CPU) occupation rate.

6 Claims, 4 Drawing Sheets

IMAGE COPYING METHOD AND DEVICE

TECHNICAL FIELD

The disclosure relates to the image processing field, and in particular to an image copying method and an image copying device.

BACKGROUND

The operation of copying image pixels from a source address to a destination address can be used during image processing, wherein the operation includes image copying, image splicing, image splitting and the like; if specific algorithms, such as rotating the image, scaling the image, greying the image, making the image transparent and the like, are added in implementation steps, the implementation steps can be applied to most image processing operations after being modified and optimized slightly.

FIG. 1 shows a typical image copying application scene, fox example, a user accesses the Internet by using a mobile terminal to enter into an application of searching weather conditions in case that the user desires to acquire the weather conditions, a cache of the application (which can be abstracted as a source image data storage part) can save image data (namely, the source image) which illustrate the weather conditions; and a source image can be stored into a Liquid Crystal Display (LCD) to refresh a data cache (in a destination image data storage part) starting from a first pixel datum on the top left corner of the source image; meanwhile, some necessary indicating bars and icons, namely, the image (in an image copying data storage part) which is to be copied needs to be saved in a proper position of the destination image data storage part; as shown in FIG. 1, an image a starts its storage from the position shown by "initial line 1"; the initial line of an image b is the position shown by "initial line 2", and the initial line of the source image is marked with "source image initial line", as shown in the figure. The image to be copied and the source image (in an image display part) is the recombined and re-spliced (in an image processing part) into a destination image which is displayed on a mobile terminal screen and finally seen by a customer.

In the above-mentioned application scene, the source image and the image to be copied is combined into a destination image, namely, the image to be copied is overlapped (copied) to the source image to obtain the destination image. However, the destination image needs to be changed (for example stretching or widening and the like) by a certain ratio. In this application scene, the process of image copying is shown in FIG. 2, which includes the steps of:

step 201, the image copying starts;

step 202, judging whether the widths of the source image, the destination image and the image to be copied are all integer multiples of 4 bytes, and judging whether the image to be copied has the same width with a source image and with a destination image, if not, executing step 203, if so, executing step 206;

step 203, calling C library function memcpy( ) to copy a line of pixel data of the image to be copied to the destination address, and executing step 204 after completely copying the line of the pixel data;

step 204, starting to copy the next line of the pixel data (namely, moving the source address downward to a line relative to that in the step 203) of the image to be copied to a corresponding destination address (moving the destination address downward to a line relative to that in the step 203);

step 205, judging whether all the lines of the pixel data of the image to be copied are completely copied, if not, returning to the Step 203, if so, completing the image copying;

step 206, judging whether the width of the image to be copied is 32 bytes in the case of the source address, destination address and width of the image to be copied all being integer multiples of 4 bytes; if so, executing step 209, and then judging whether the height of the image to be copied is 16 lines, if so, executing step 210 to call the C library function memcpy( ) for 16 times, in which one line of the pixel data (namely, 32 bytes) is copied each time, until the copying process is completed; if the height is not 16 lines, returning to the step 203;

wherein if the width of the image to be copied is not 32 bytes, executing step 207, judging whether the source image has the same width with the destination image, if so, taking multiple lines of the image to be copied as one line and executing the step 203, if not, directly returning to the step 203.

The above-mentioned image copying method calls the C library function memcpy( ) to copy the images to be copied line by line, but such image processing process is time-consuming, and seriously occupies resources in a Central Processing Unit (CPU).

SUMMARY

In view of this, the main purpose of the disclosure is to provide an image copying method and an image copying device, which can save the time for the image processing and reduce the occupied CPU resource.

In order to achieve the purpose, the technical scheme of the disclosure is realized below.

The disclosure provides an image copying method, which includes the steps of:

copying, an image to be copied, to a destination address line by line, in the case of the image to be copied having a width of one pixel;

copying, the image to be copied, to the destination address by a number of bytes according to a size of the image to be copied, in the case of the image to be copied not having a width of one pixel.

Further, the step of copying the image to be copied to the destination address by a number of bytes according to the size of the image to be copied, in the case of the image to be copied not having a width of one pixel comprises:

when the image to be copied has the same width with a source image and with a destination image and when the size of the image to be copied is greater than or equal to 512 bytes, copying the image to be copied to the destination address by 512 bytes each time.

Further, the image to be copied does not have the same width with the source image and with the destination image, or when the image to be copied has the same width with the source image and with the destination image but the size of the image to be copied is smaller than 512 bytes, the method further comprises:

copying least-significant 2 bytes of the source image to the destination address in the case of the destination address not being integer multiples of 4 bytes;

loading the least-significant 2 bytes of the source image into a register, and copying the image to be copied to the destination address by the number of bytes based on the size of the image to be copied, in the case of a source address not being integer multiples of 4 bytes.

Further, the step of loading the least-significant 2 bytes of the source image into a register, and copying the image to be copied to the destination address by the number of bytes according to the size of the image to be copied comprises:

when the size of the image to be copied is greater than or equal to 18 bytes, copying the image to be copied to the destination address by 16 bytes each time until the size of the image remaining to be copied is smaller than 16 bytes, and determining whether the size of the image remaining to be copied is smaller than 8 bytes; when the size of the image to be copied is smaller than 18 bytes, determining whether the size of the image to be copied is smaller than 8 bytes;

when the size of the image to be copied is smaller than 16 bytes but greater than 8 bytes, copying 8 bytes of the image to be copied to the destination address, and determining whether the size of the image remaining to be copied is smaller than 4 bytes; when the size of the image to be copied is smaller than 8 bytes, determining whether the size of the image to be copied is smaller than 4 bytes;

when the size of the image to be copied is smaller than 8 bytes but greater than 4 bytes, copying 4 bytes of the image to be copied to the destination address, and determining whether the size of the image remaining to be copied is equal to 2 bytes;

when the size of the image to be copied is smaller than 4 bytes, determining whether the size of the image to be copied is equal to 2 bytes;

when the image to be copied is equal to 2 bytes, copying 2 bytes of the image to be copied to the destination address to complete the image copying; otherwise, indicating the size of the image remaining to be copied is equal to 0 byte and completing the image copying.

Further, the step of copying the image to be copied to the destination address by the number of bytes according to the size of the image to be copied in the case of both the destination address and the source address being integer multiples of 4 bytes comprises:

when the size of the image to be copied is greater than or equal to 32 bytes, copying the image to be copied to the destination address by 32 bytes each time until the size of the image remaining to be copied is smaller than 16 bytes, and determining whether the size of the image remaining to be copied is smaller than 16 bytes when the size of the image to be copied is smaller than 32 bytes;

when the size of the image to be copied is smaller than 32 bytes but greater than 16 bytes, copying 16 bytes of the image to be copied to the destination address, and determining whether the size of the image remaining to be copied is smaller than 8 bytes; when the size of the image to be copied is smaller than 16 bytes, determining whether the size of the image to be copied is smaller than 8 bytes;

when the size of the image to be copied is smaller than 16 bytes but greater than 8 bytes, copying 8 bytes of the image to be copied to the destination address, and determining whether the size of the image remaining to be copied is smaller than 4 bytes; when the size of the image to be copied is smaller than 8 bytes, determining whether the size of the image to be copied is smaller than 4 bytes;

when the image to be copied is smaller than 8 bytes but greater than 4 bytes, copying 4 bytes of the image to be copied to the destination address and determining whether the size of the image remaining to be copied is smaller than 2 bytes; when the size of the image to be copied is smaller than 4 bytes, determining whether the size of the image to be copied is equal to 2 bytes;

when the image to be copied is equal to 2 bytes, copying 2 bytes of the image to be copied to the destination address to complete the image copying; otherwise, indicating the size of the image remaining to be copied is equal to 0 byte and completing the image copying.

The disclosure also provides an image copying device, which includes an analysis module and a copying module, wherein the analysis module is configured to analyze an image to be copied, to obtain an analysis result and to notify the copying module of the analysis result;

the copying module is configured to, according to the analysis result of the image to be copied which is analyzed by the analysis module, to copy the image to be copied to the destination address line by line in the case of the image to be copied having a width of one pixel;

to copy the image to be copied to the destination by a number of bytes according to a size of the image to be copied in the case of the width of the image to be copied not having a width of one pixel.

The image copying method according to the disclosure combines the characteristics of the specific image resource data so as to classifying the image for the processing, which can greatly accelerate the speed for image copying, widely be applied to the image processing process, effectively alleviate the problem that the image updating is slow, and greatly improve the user experience.

DETAILED DESCRIPTION

The technical scheme of the disclosure is further described below with reference to the drawings and embodiments in details.

Figure 1:
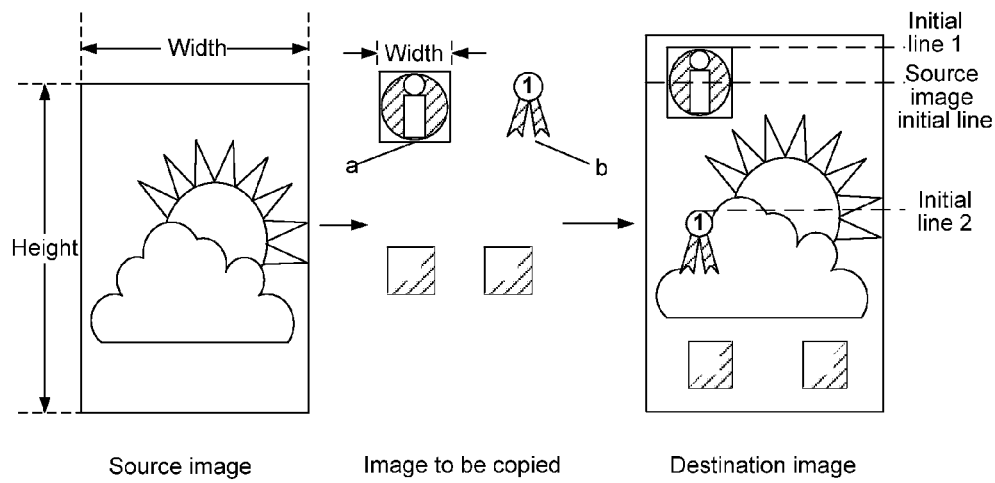
FIG. 1 shows a typical image copying application scene in the related art.
Figure 2:
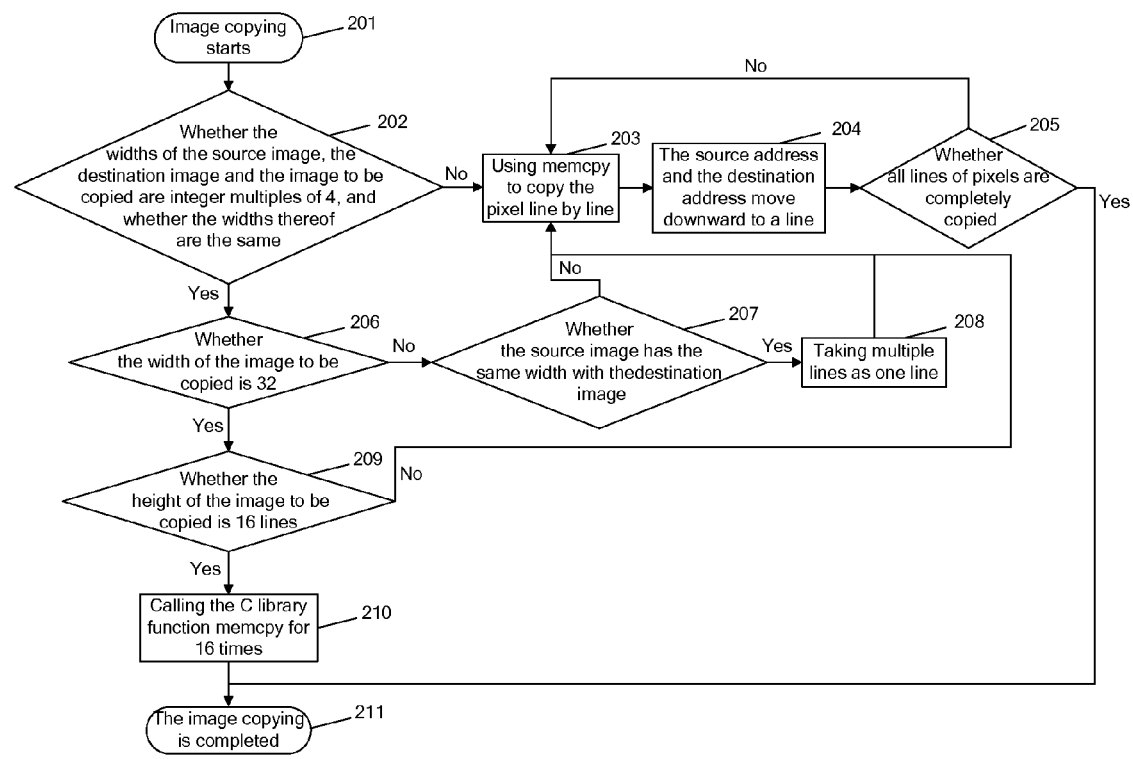
FIG. 2 shows an image copying process according to the related art.
Figure 3:
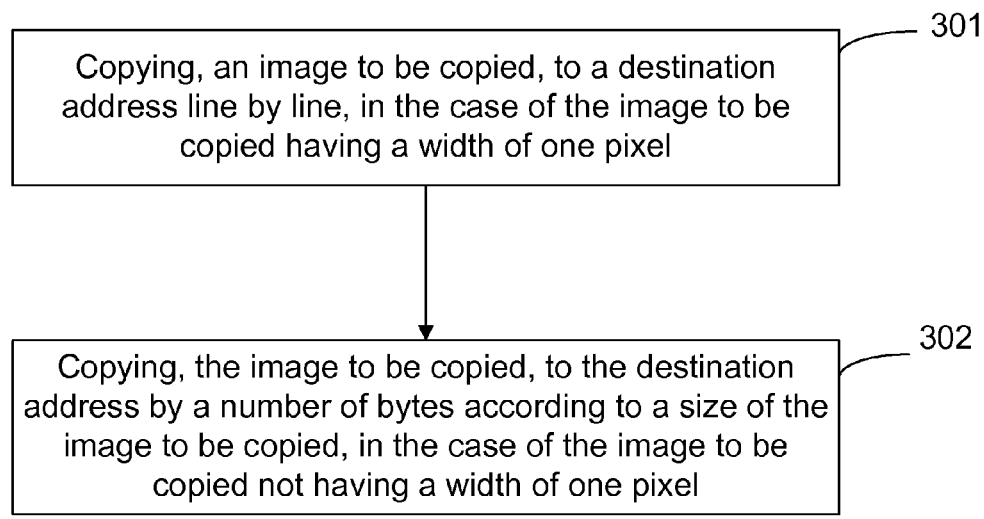
FIG. 3 shows an image copying process according to the disclosure.

The main idea of the image copying according to the disclosure is to analyze the image to be copied, and then to adopt different copying methods for the images with different attributes; as shown in FIG. 3, the method includes:

step 301, copying, an image to be copied, to a destination address line by line, in the case of the image to be copied having a width of one pixel; and step 302, copying, the image to be copied, to the destination address by a number of bytes according to a size of the image to be copied, in the case of the image to be copied not having a width of one pixel.

Figure 4:
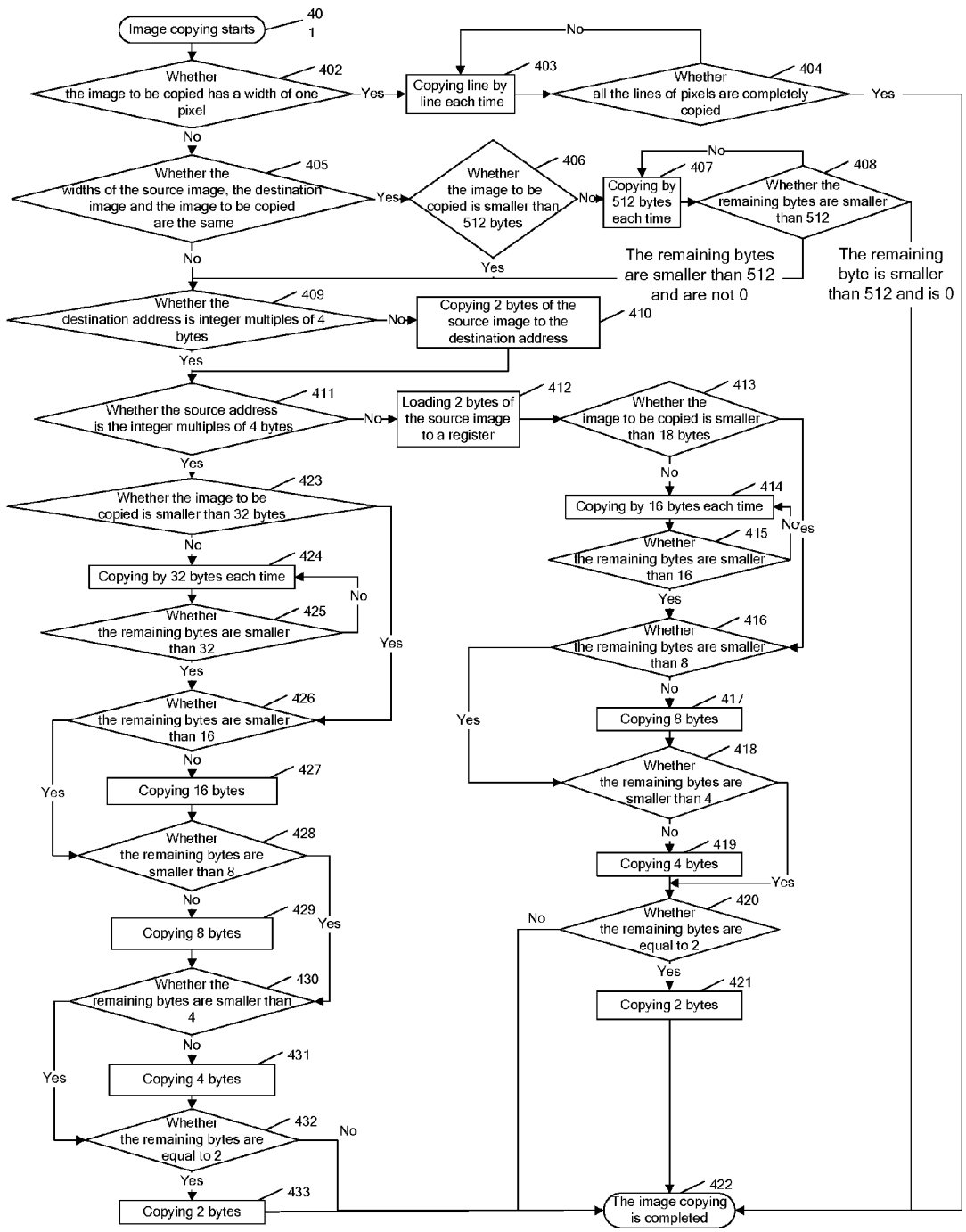
FIG. 4 shows an image copying process according to an embodiment of the disclosure.

The image copying method according to the disclosure is described below through specific embodiments; as shown in FIG. 4, the method includes:

step 401, the image copying starts;

step 402, judging whether the image to be copied has a width of one pixel (32 bytes), namely, whether the image to be copied is a single-column chart, if so, executing step 403, if not, executing step 405;

steps 403 to 404, copying a line of the image (namely, one pixel of 32 bytes) to be copied to the destination each time in the case of the image to be copied having a width of one pixel, until all pixels of the image to be copied are completely copied line by line, and then the image copying is completed;

step 405, judging whether the image to be copied has the same width with the source image, the destination image in the case of the image to be copied having a width of one pixel, if so, executing step 406, if not, executing step 409;

step 406, judging whether the size of the image to be copied is smaller than 512 bytes in the case of the image to be copied having the same width with the source image and the destination image, if so, executing step 409; if the size of the image to be copied is greater than or equal to 512 bytes, executing step 407;

steps 407 to 408, copying the image to be copied to the destination address by 512 bytes each time (namely, taking multiple lines of the image to be copied as one line to copy, wherein the line represented the multiple lines has a size of 512 bytes), until the image to be copied is smaller than 512 bytes; at this time, if the image remaining to be copied is smaller than 512 bytes and is 0, the image copying is completed; if the image remaining to be copied are smaller than 512 bytes and are not 0, executing step 409;

steps 409 to 410, judging whether the destination address is the integer multiples of 4 bytes; if not, copying the headmost 2 bytes of the source image to the destination address, thus the destination address is the integer multiple of 4 bytes and then executing step 411; and if the destination address is the integer multiple of 4 bytes, directly executing step 411;

step 411, judging whether the source address is the integer multiples of 4 bytes, wherein the source address can be the integer multiples of 4 bytes, or not; in addition, as the headmost 2 bytes of the source image are copied to the destination address in the step 410, it may cause that the source address is not the integer multiples of 4 bytes; thereby, it needs to judge whether the source address is the integer multiples of 4 bytes; if so, executing step 423; and if not, executing step 412;

steps 412 to 422, loading the headmost 2 bytes of the source image into a register in the case of the destination address being the integer multiples of 4 bytes, and the source address being not; and thus, the source address is the integer multiples of 4 bytes;

and then continuing the image copying, wherein the image can be copied by 16 bytes each time; judging whether the image to be copied is smaller than 18 bytes; if not, copying the image to be copied to the destination address by 16 bytes each time, until the size of the image remaining to be copied are smaller than 16 bytes; at this time, judging whether the size of the image remaining to be copied is smaller than 8 bytes; and if so, judging whether the size of the image remaining to be copied is smaller than 8 bytes;

if the image to be copied is smaller than 16 bytes and greater than 8 bytes, copying 8 bytes of the image to be copied to the destination address, and then judging whether the image to be copied is smaller than 4 bytes; and if the image to be copied is smaller than 8 bytes, judging whether the image to be copied is smaller than 4 bytes;

if the image to be copied is smaller than 8 bytes and greater than 4 bytes, copying 4 bytes of the image to be copied to the destination address, and then judging whether the image to be copied is equal to 2 bytes; if the image to be copied is smaller than 4 bytes, judging whether the image remaining to be copied is equal to 2 bytes; and it should be noted that when the image to be copied is smaller than 4 bytes, the size of the image remaining to be copied is 2 bytes or 0 byte;

if the image remaining to be copied is equal to 2 bytes, copying the 2 bytes to the destination image address, and then the image copying is completed; otherwise, the image remaining to be copied is equal to 0 byte, which means the copying process is completed;

steps 423 to 433, judging whether the image to be copied is smaller than 32 bytes in the case of both the source address and the destination address being the integer multiples of 4 bytes; if so, judging whether the image to be copied is smaller than 16 bytes; and if not, copying the image to be copied to the destination address by 32 bytes each time, until the image to be copied is smaller than 16 bytes;

when the image to be copied is smaller than 32 bytes and greater than 16 bytes, copying 16 bytes of the image to be copied to the destination address, and then judging whether the size of the image remaining to be copied is smaller than 8 bytes; when the image to be copied is smaller than 16 bytes, judging whether the size of the image remaining to be copied is smaller than 8 bytes;

if the image to be copied is smaller than 16 bytes and greater than 8 bytes, copying 8 bytes of the image to be copied to the destination address, and then judging whether the image to be copied is smaller than 4 bytes; and if the image to be copied is smaller than 8 bytes, judging whether the image to be copied is smaller than 4 bytes;

if the image to be copied is smaller than 8 bytes and greater than 4 bytes, copying 4 bytes of the image to be copied to the destination address, and then judging whether the size of the image remaining to be copied is equal to 2 bytes; if the image to be copied is smaller than 4 bytes, judging whether the size of the image remaining to be copied is equal to 2 bytes; and it should be noted that when the image to be copied is smaller than 4 bytes, the size of the image remaining to be copied is 2 bytes or 0 byte.

If the size of the image remaining to be copied is equal to 2 bytes, copying the 2 bytes to the destination address, and then the image copying is completed; otherwise, the size of the image remaining to be copied is equal to 0 byte, which means the copying process is completed.

Figure 5:
FIG. 5 shows a structural diagram of an image copying device according to the disclosure.

In order to realize the above-mentioned method, the disclosure also provides an image copying device. As shown in FIG. 5, the device includes an analysis module 10 and a copying module 20, wherein the analysis module 10 is configured to analyze an image to be copied, to obtain an analysis result, and to the copying module 20 of the analysis result;

the copying module 20 is configured, according to the analysis result of the image to be copied which is analyzed by the analysis module 10, to copy the image to be copied to the destination address line by line in the case of the image to be copied having a width of one pixel; to copy the image to be copied to the destination by a number of bytes according to a size of the image to be copied in the case of the width of the image to be copied not having a width of one pixel.

All those described above are only the preferred embodiments of the disclosure and not intended to limit the scope of the disclosure.

What is claimed is:

1. An image copying method, comprising the steps of:
    copying, an image to be copied, to a destination address line by line, in the case of the image to be copied having a width of one pixel;
    copying, the image to be copied, to the destination address by a number of bytes according to a size of the image to be copied, in the case of the image to be copied not having a width of one pixel.

2. The image copying method according to claim 1, wherein the step of copying the image to be copied to the destination address by a number of bytes according to the size of the image to be copied, in the case of the image to be copied not having a width of one pixel comprises:

when the image to be copied has the same width with a source image and with a destination image and when the size of the image to be copied is greater than or equal to 512 bytes, copying the image to be copied to the destination address by 512 bytes each time.

3. The image copying method according to claim 2, wherein, when the image to be copied does not have the same width with the source image and with the destination image, or when the image to be copied has the same width with the source image and with the destination image but the size of the image to be copied is smaller than 512 bytes, the method further comprises:
copying least-significant 2 bytes of the source image to the destination address in the case of the destination address not being integer multiples of 4 bytes;
loading the least-significant 2 bytes of the source image into a register, and copying the image to be copied to the destination address by the number of bytes based on the size of the image to be copied, in the case of a source address not being integer multiples of 4 bytes.

4. The image copying method according to claim 3, wherein the step of loading the least-significant 2 bytes of the source image into a register, and copying the image to be copied to the destination address by the number of bytes according to the size of the image to be copied comprises:
when the size of the image to be copied is greater than or equal to 18 bytes, copying the image to be copied to the destination address by 16 bytes each time until the size of the image remaining to be copied is smaller than 16 bytes, and determining whether the size of the image remaining to be copied is smaller than 8 bytes; when the size of the image to be copied is smaller than 18 bytes, determining whether the size of the image to be copied is smaller than 8 bytes;
when the size of the image to be copied is smaller than 16 bytes but greater than 8 bytes, copying 8 bytes of the image to be copied to the destination address, and determining whether the size of the image remaining to be copied is smaller than 4 bytes; when the size of the image to be copied is smaller than 8 bytes, determining whether the size of the image to be copied is smaller than 4 bytes;
when the size of the image to be copied is smaller than 8 bytes but greater than 4 bytes, copying 4 bytes of the image to be copied to the destination address, and determining whether the size of the image remaining to be copied is equal to 2 bytes;
when the size of the image to be copied is smaller than 4 bytes, determining whether the size of the image to be copied is equal to 2 bytes;
when the image to be copied is equal to 2 bytes, copying 2 bytes of the image to be copied to the destination address to complete the image copying; otherwise, indicating the size of the image remaining to be copied is equal to 0 byte and completing the image copying.

5. The image copying method according to claim 3, wherein the step of copying the image to be copied to the destination address by the number of bytes according to the size of the image to be copied in the case of both the destination address and the source address being integer multiples of 4 bytes comprises:
when the size of the image to be copied is greater than or equal to 32 bytes, copying the image to be copied to the destination address by 32 bytes each time until the size of the image remaining to be copied is smaller than 16 bytes, and determining whether the size of the image remaining to be copied is smaller than 16 bytes when the size of the image to be copied is smaller than 32 bytes;
when the size of the image to be copied is smaller than 32 bytes but greater than 16 bytes, copying 16 bytes of the image to be copied to the destination address, and determining whether the size of the image remaining to be copied is smaller than 8 bytes; when the size of the image to be copied is smaller than 16 bytes, determining whether the size of the image to be copied is smaller than 8 bytes;
when the size of the image to be copied is smaller than 16 bytes but greater than 8 bytes, copying 8 bytes of the image to be copied to the destination address, and determining whether the size of the image remaining to be copied is smaller than 4 bytes; when the size of the image to be copied is smaller than 8 bytes, determining whether the size of the image to be copied is smaller than 4 bytes;
when the image to be copied is smaller than 8 bytes but greater than 4 bytes, copying 4 bytes of the image to be copied to the destination address and determining whether the size of the image remaining to be copied is smaller than 2 bytes; when the size of the image to be copied is smaller than 4 bytes, determining whether the size of the image to be copied is equal to 2 bytes;
when the image to be copied is equal to 2 bytes, copying 2 bytes of the image to be copied to the destination address to complete the image copying; otherwise, indicating the size of the image remaining to be copied is equal to 0 byte and completing the image copying.

6. An image copying device, comprising an analysis module and a copying module, wherein
the analysis module is configured to analyze an image to be copied, to obtain an analysis result, and to notify the copying module of the analysis result;
the copying module is configured, according to the analysis result of the image to be copied which is analyzed by the analysis module,
to copy the image to be copied to the destination address line by line in the case of the image to be copied having a width of one pixel; and
to copy the image to be copied to the destination by a number of bytes according to a size of the image to be copied in the case of the width of the image to be copied not having a width of one pixel.

* * * * *